United States Patent [19]

Takahashi et al.

[11] 4,330,459

[45] May 18, 1982

[54] METHOD OF MANUFACTURING FOUNDRY SAND MOLDS

[75] Inventors: Hideo Takahashi; Keishiro Igi; Hisashi Ogawara; Haruo Nakayasu, all of Kurashiki, Japan

[73] Assignee: Kuraray Company, Ltd., Okayama, Japan

[21] Appl. No.: 105,534

[22] Filed: Dec. 20, 1979

[30] Foreign Application Priority Data

Dec. 20, 1978 [JP] Japan .................................. 53-158272
Dec. 20, 1978 [JP] Japan .................................. 53-158273
Dec. 29, 1978 [JP] Japan .................................. 53-161913
Jan. 23, 1979 [JP] Japan .................................. 54-6719
Aug. 6, 1979 [JP] Japan .................................. 54-100514

[51] Int. Cl.³ .................. B28B 7/34; C08L 1/26; C08L 33/02; C08K 3/36
[52] U.S. Cl. .................. 523/148; 106/38.5 R; 260/998.18; 524/600; 524/603
[58] Field of Search .................. 260/DIG. 40, 998.18, 260/29.6 H, 29.6 WA, 42.52, 42.55; 106/38.2, 38.5 R

[56] References Cited

U.S. PATENT DOCUMENTS

| | | | |
|---|---|---|---|
| 2,765,507 | 10/1956 | Wolf et al. | 260/DIG. 40 |
| 3,330,674 | 7/1967 | Santmyer | 106/38.5 R |
| 3,640,826 | 2/1972 | Lang et al. | 260/17.4 GC |
| 3,947,392 | 3/1976 | Lang et al. | 260/DIG. 40 |
| 4,106,944 | 8/1978 | Epstein | 106/38.2 |
| 4,183,759 | 1/1980 | Epstein | 106/38.2 |
| 4,203,771 | 5/1980 | Matsui et al. | 106/38.5 R |

FOREIGN PATENT DOCUMENTS

| | | |
|---|---|---|
| 656254 | 2/1938 | Fed. Rep. of Germany . |
| 2814357 | 3/1978 | Fed. Rep. of Germany . |
| 7636682 | 12/1976 | France . |
| 36-7609 | 6/1961 | Japan . |
| 36-8708 | 6/1961 | Japan . |
| 42-25627 | 12/1967 | Japan . |
| 43-14921 | 6/1968 | Japan . |
| 48-15771 | 5/1973 | Japan . |
| 51-27404 | 8/1976 | Japan . |
| 51-39605 | 10/1976 | Japan . |
| 51-126326 | 11/1976 | Japan . |
| 51-46482 | 12/1976 | Japan . |
| 53-95125 | 8/1978 | Japan . |
| 52-723328 | 10/1978 | Japan . |
| 53-129121 | 11/1978 | Japan . |
| 1334695 | 11/1970 | United Kingdom . |
| 1504708 | 10/1975 | United Kingdom . |
| 1530641 | 6/1976 | United Kingdom . |

*Primary Examiner*—Allan Lieberman
*Attorney, Agent, or Firm*—Oblon, Fisher, Spivak, McClelland & Maier

[57] ABSTRACT

Mixing (a) a carboxylic acid, (b) a divalent or trivalent metal oxide or hydroxide and (c) a foundry molding sand in the presence of an aqueous solution of (d) a carboxyl-group-containing polymer or (e) water followed by shaping and curing can provide sand molds having sufficiently high green strength without contamination of the working environment. The molding sand composition has excellent processability, which means filling of shapes or molds with the sand can be done with ease. The sand molds manufactured in this way can be disintegrated by a simple procedure. Therefore the molding sand can be used over and over again and does not cause environmental pollution due to disposal of the molding sand.

19 Claims, No Drawings

METHOD OF MANUFACTURING FOUNDRY SAND MOLDS

BACKGROUND OF THE INVENTION

1. Field of the Invention

This invention relates to a method of manufacturing foundry sand molds (including cores). More particularly, it relates to an improved method of manufacturing sand molds which comprises mixing (a) a carboxylic acid, (b) a divalent or trivalent metal oxide or hydroxide and (c) a foundry molding sand in the presence of and aqueous solution of (d) a carboxyl-group-containing polymer or water (e) followed by shaping and hardening.

2. Description of the Prior Art

Foundry sand molds have been manufactured by adding a variety of inorganic or organic binders to a foundry sand. However, each of these inorganic and organic binders has its own merits and demerits. Thus they are not always satisfactory. When water glass, for instance, is used as a binder, the molding sand can be used only once and disposal of the used sand may result in gradual dissolution of the water glass adhering to the sand surface, which means leaching of alkaline substances and consequent alkalinization of the surrounding soil, leading not only the withering of trees and plants but also to killing of organisms living in the soil and in the water. When organic binders such as self-curing furan or phenol resins are used, the organic materials can be removed after use by burning the sand and the sand can be reused. However, in burning the sand, a bad smell is produced. Moreover, the rate of curing of the binder and the mechanical strengths of the sand mold vary significantly depending on such factors as properties of the sand, moisture content thereof, temperature, humidity, kind of acid used as binder and concentration thereof and consequently handling of the molding sand is a task of considerable difficulty. It is also a disadvantage that such a binder must be used up within several months after preparation because polymerization of the binder proceeds gradually during storage thereof.

According to the method disclosed in Japanese Patent Publication No. 6259/1953 or U.S. Pat. No. 2,765,507, which uses an acrylic acid polymer as a binder or according to the method disclosed in Japanese Patent Publication No. 8708/1961 (Patent of Addition to the above), which uses an acrylic acid-acrylonitrile copolymer as a binder, no unpleasant smell is produced in the manufacture of sand molds or in the pouring of molten metal, but green strengths are very low, whereby roasting is required for practical use. In the present time when extra-large castings are manufactured, it is difficult to prepare an apparatus for such roasting and therefore such binders cannot be employed in foundry practice. Although it is known that green strength can be increased by adding such metal oxides and hydroxides as magnesium oxide and aluminum hydroxide as curing agents for the binders used according to the above-mentioned method, mere standing of the sand mold in atmospheric conditions without roasting thereof after manufacture can indeed lead to easy hardening of the surface portion but the inner part does not harden so that only very low green strength is obtained. The resulting sand mold therefore cannot endure the load to be carried thereby in pouring molten metal in the manufacture of relatively large castings. In addition, where there is no exposure to the atmosphere, the moisture originating from the aqueous solution of the polymer used as a binder remains in the sand mold. On pouring molten metal, the moisture in the molding sand, i.e. the mold, is converted into water vapor by the high temperature of the molten metal. The vapor blows out and causes formation of uneven surfaces of the casting. It is also a disadvantage that castings having smooth surfaces cannot be obtained.

Another method of manufacturing foundry sand molds is disclosed in Japanese Patent Application Laid-Open No. 129,121/1978 or German Patent Application Laid-Open (Offenlegungsschrift) No. 2,815,753. The method comprises adding polyacrylic acid, aluminosilicate glass, tartaric acid and/or molten granular magnesia to a molding sand followed by mixing in the presence of water and shaping. However, this method has some disadvantages. Thus, since the principal component of the curing agent is the aluminosilicate glass, crushing after casting is troublesome and accumulation of the glass caused by repeated use may make further reuse a hard task. Furthermore, the moisture content in the sand mold as manufactured amounts to 2 to 5%, which is far above the preferable moisture content of not more than about 1%.

Furthermore, the method to make foundry sand mold by kneading the foundry sand adding citric acid, metal oxide and water is known in the Japanese Patent Application No. 27404/1976. This method has the disadvantages of shortening the working time, becoming rapidly sticky when an ordinary metal oxide is used, and becoming incapable of practical use because of the remarkably low residual green strength at high temperature. In addition, a method using a combination of metal oxides such as zinc oxide, hydroxylic acids such as tartaric acid and water as binder components is also disclosed in the Japanese Patent Application Laid-Open No. 126326. However, this method has the same disadvantages as mentioned above.

SUMMARY OF THE INVENTION

This invention is directed to a solution of the above-mentioned problems found in the prior art. Accordingly, the first object of the invention is to provide a method of manufacturing foundry sand molds which can be used in practice without forced drying and have sufficient green strength throughout the mold.

The second object is to provide a method of manufacturing foundry sand molds having smooth surfaces.

The third object is to provide a method of manufacturing foundry sand molds which can easily be disintegrated simply by spraying used sand molds with small amounts of water and also a method of manufacturing foundry sand molds which makes it possible to use the molding sand so disintegrated over and over again.

The fourth object is to provide a method of manufacturing foundry sand molds which does not produce any unpleasant smell or any toxic gases during the manufacture of the sand molds and eliminate the possibility of environmental pollution such as contamination of the soil with alkalies by disposal of used molding sands.

The fifth object is to provide a method of manufacturing foundry sand molds which have at a high temperature residual strength large enough for practical use.

The sixth object is to provide a method of manufacturing foundry sand molds which is excellent in workability and gives molding sand compositions that can be prepared by easy working processes of mixing ingredients, said composition showing no significant increase in viscosity over at least 30 minutes after mixing the components, it being possible to fill shapes with the composition in a simple manner with increased specific gravities of the fillings being attainable.

According to the present invention, the first to fifth objects described above are achieved by mixing (a) a least one carboxylic acid selected from the group consisting of polycarboxylic acids each having two or more carboxyl groups per molecules and hydroxylcarboxylic acids each having at least one hydroxyl group and at least one carboxyl group per molecule, (b) a divalent or trivalent metal oxide or hydroxide and (c) a foundry molding sand in the presence of an aqueous solution of (d) carboxyl-group-containing polymer followed by shaping and curing. When especially higher green strength is required, such strength is obtained mainly with the combination of maleic anhydride, malic acid or citric acid as carboxylic acid (a) and magnesium oxide or magnesium hydride as divalent or trivalent metal oxide or hydroxide. When especially higher residual strength at high temperature is required, such strength is obtained mainly by using an aqueous solution of (d) carboxyl-group-containing polymer, preferably polyacrylic acid.

Furthermore, the first to fourth and sixth objects are achieved by mixing (a) at least one carboxylic acid selected from the group consisting of polycarboxylic acids each having two or more carboxyl groups per molecule and hydroxycarboxylic acids each having at least one hydroxyl group and at least one carboxyl group per molecule, (b) magnesium oxide having a size of 220 to 320 angstroms in the direction of the [200] direction of the crystal thereof as measured by X-ray diffractometry as the divalent or trivalent metal oxide and (c) a foundry molding sand in the presence of (e) water in place of an aqueous solution of (d) carboxyl-group-containing polymer (wherein residual strength at high temperature is not necessary to some extent) followed by shaping and curing.

Accordingly, the best mode of practicing the present invention consists in the use of citric acid, maleic anhydride or malic acid as the carboxylic acid (a), magensium oxide having a size of 220 to 320 angstroms in the direction of the [200] direction of the crystal thereof as measured by X-ray diffractometry as the divalent or trivalent metal oxide or hydroxide (b) and an aqueous solution of polyacrylic acid as an aqueous solution of carboxyl-group-containing polymer (d).

DETAILED DESCRIPTION OF THE INVENTION

The foundry molding sand to be used in practicing the invention may be any of the conventional molding sands. The sand compositions according to the invention have the merit that they can be reused. While the sand molds after casting are already subject to disintegration, the addition of water makes disintegration occur even more easily. Therefore, the molding sand is scarcely damaged or broken and, when fresh binder is added to cover up the loss caused during casting, can be used over and over again. In such repeated use, there is no need of adding the divalent or trivalent metal oxide or hydroxide. Consequently no specific components accumulate in the molding sand, so that the sand can be used a very large number of times.

The carboxylic acid (a) to be used in practicing the invention includes polycarboxylic acids such as discarboxylic and tricarboxylic acids and hydroxycarboxylic acids. The term "polycarboxylic acids" as used herein means organic compounds having 2 to 20, preferably 3 to 10, carbon atoms and containing two or more carboxyl groups or groups capable of being converted into carboxyl groups per molecule. Examples of such polycarboxylic acids are oxalic, malonic, succinic, glutaric, adipic, pimelic, suberic, azelaic and sebacic acid and other saturated aliphatic dicarboxylic acids; tricarballylic and aconitic acid and other saturated tricarboxylic or polycarboxylic acids; maleic acid, maleic anhydride, fumaric, citraconic, mesaconic and itaconic acid and other unsaturated aliphatic dicarboxylic acids; 2-carboxymaleic and 2-carboxyglutaric acid and other unsaturated aliphatic tri- and polycarboxylic acids; phthalic, isophthalic and terephthalic acid, phthalic anhydride and other aromatic dicarboxylic acids; trimellitic acid, trimellitic anhydride, pyromellitic acid, 1,2,4,5-benzenetetracarboxylic dianhydride, benzenepentacarboxylic acid and other aromatic tri- and polycarboxylic acids.

The term "hydroxycarboxylic acids" as used herein means organic compounds having 2 to 20, preferably 3 to 11, carbon atoms and containing at least one hydroxyl group per molecule as well as at least one carboxyl group or group capable of being converted into a carboxyl group. Examples of such hydroxycarboxylic acids are glycolic, lactic, malic, trihydroxyglutaric, tartaric, citric and hydroxyacrylic acid and other aliphatic hydroxycarboxylic acids; hydroxybenzoic, 2-hydroxyisophthalic, 4,5-dihydroxyphthalic and 2,5-dihydroxyterephthalic acid and other aromatic hydroxycarboxylic acids.

To sum up, the carboxylic acids to be used according to the present invention are those organic compounds that have 3 to 20 carbon atoms and either contain at least two carboxyl groups or contain at least one carboxyl group and at least one hydroxyl group.

Among these preferred are such polycarboxylic acids as maleic anhydride, adipic acid, trimellitic acid and trimellitic anhydride and such hydroxycarboxylic acids as citric acid and 2-hydroxyisophthalic acid because they develop very high green strength. Especially preferred are maleic anhydride, malic acid and citric acid. When the green strength is required to be ten and odd kg/cm$^2$, citric acid should be used. These carboxylic acids may be used alone or in combination of two or more of them.

The divalent or trivalent metal oxide or hydroxide, which is another important component to be used in practicing the invention, includes oxides and hydroxides of magnesium, aluminum, calcium, zinc, iron etc., such as magnesium oxide, calcium oxide, zinc oxide, aluminum oxide, magnesium hydroxide, calcium hydroxide, aluminum hydroxide and iron oxide. Among these, magnesium oxide and magnesium hyroxide are preferred. These metal oxides and hydroxides may be used either alone or in combination of two or more. Prolongation of the working time of the molding sand composition, which is one of improvements attainable by the present invention, can be achieved especially when specific grades of magnesium oxide that have a size of 220 to 320 angstroms in the [200] direction of the crystal thereof as measured by X-ray diffractometry are used as the divalent or trivalent metal oxide or hydroxide (b). Such grades of magnesium oxide that have a size (D) in the [200] direction of the crystal thereof as measured by X-ray diffractometry of 220 to 320, preferably 240 to 300 angstroms can be prepared, for example, by firing in an electric furance at temperatures of 860° to 117° C. a commercially available light burned magnesium which has a size of 95 to 210 angstroms in the [200] direction of the crystal thereof. If the crystal size (D) is less than 220 angstroms, the working time will be too short, and if, conversely, it exceeds 320 angstroms, sand mold strength can scarecely be developed even after seven days of standing, hernce the objects of the invention can not achieved.

The size (D) in the [200] direction of the crystal as mentioned herein is the value determined by the Scherrer's equation concerning X-ray diffraction.

Thus specified magnesium oxide gives not only an advantage to prolong the forementioned working time, but also a merit to give the foundry mold having enough green strength simply by applying water and not always by applying carboxyl-group-containing polymers.

The carboxyl-group-containing polymer to be used in practicing the invention includes polymers having carboxyl groups and polymers having functional groups which can react with water or an alkaline compound to yield carboxylic acids or carboxylic acid salts, as shown below:

(1) Homopolymers of acrylic, methacrylic, crotonic, itaconic, maleic, citraconic and mesaconic acid and monoesters thereof and other monomers containing one or more carboxyl groups and binary or multicomponent copolymers of such monomers and unsaturated monomers copolymerizable therewith such as styrene, styrene derivatives, alkenes, cyclohexene, vinyl halides, vinyl esters, allyl esters, acrylamide, acrylonitrile, methacrylonitrile, vinyl ethers, allyl alkyl ethers, acrylic acid esters, methacrylic acid esters, crotonic acid esters, amleic acid diesters and fumaric acid diesters;

(2) Hydrolysis or alkali saponification products from homopolymers of nonomers containing at least one functional group capable of being converted into a carboxyl group by hydrolysis or alkali saponification such as maleic anhydride, citraconic anhydride, itaconic anhydride, acrylamide, acrylonitrile, methacrylonitrile, acrylic acid esters, maleic acid diesters and fumaric acid diesters and from binary or multicomponent copolymers of such monomers and other monomers copolymerizable therewith such as styrene, styrene derivatives, alkenes, cyclohexene, vinyl halides, vinyl esters, vinyl ethers and allyl alkyl ethers; and (3) Polymeric materials produced by introducing carboxyl groups into macromolecules having reactive functional groups in side chains thereof by esterification, etherification, acetalization or some other reaction, such as polyvinyl alcohol esterified with oxalic acid, polyvinyl alcohol etherified with glycolic acid, polyvinyl alcohol acetalized with glyoxalic acid and carboxymethylcellulose.

Among these carboxyl-group-containing polymers, preferred are those mentioned under (1) and (2), more specifically, plyacrylic acid, polymethacrylic acid, other polyacrylic polymers and copolymers, copolymers of alpha-olefins and maleic anhydride, and copolymers of maleic anhydride and styrene, vinyl acetate or methyl vinyl ether. More preferred are polyacrylic acid, ethylene-maleic anhydride copolymer (preferably with a maleic anhydride content of not less than 50 mole percent), isobutylene-maleic anhydride copolymer, styrene-maleic anhydride copolymer and other maleic anhydride copolymers. Especially preferred is polyacrylic acid. These carboxyl-group-containing polymers may be used either alone or in combination of two or more. Those carboxyl-group-containing polymers that are easily soluble in water can be used in the form of aqueous solutions using water alone is the solvent, while those that are hardly soluble in water can be used in the form of aqueous solutions containing basic substances such as ammonia, sodium hydroxide and potassium hydroxide.

In addition to the above-mentioned essential components, there may be added in some cases such materials as wood flour, sawdust, fire clays, silica powder, bentonite, boric acid, sulfuric acid, plastics, latexes and emulsions.

The proportion of the carboxylic acid (a) to the molding sand (c), i.e. the ratio a/c, is required to be not less than 0.0015, preferably not less than 0.005, by weight. Insufficient amounts of the carboxylic acid cannot produce the effect of addition thereof. On the other hand, excessive amounts are uneconomical. Therefore, the ratio a/c should preferably be not more than 0.2, more preferably not more than 0.09.

The proportion of the divalent or trivalent metal oxide or hydroxide (b) to the molding sand (c), i.e. the ratio b/c, is required to be 0.001–0.05, preferably 0.005–0.02. When an aqueous solution of a carboxyl-group-containing polymer is not used but water alone is used, the ratio b/c is 0.0025–0.03, preferably 0.01–0.02. Therefore, generally, the ratio is preferably in the range of 0.005–0.02.

The proportion of the carboxyl-group-containing polymer (d) to the molding sand (c), i.e. the ratio d/c, is desirably not more than 0.055, preferably in the range of 0.0006 to 0.055. When the amount of the carboxyl-group-containing polymer is below this range, satisfactory effects of addition thereof cannot be produced and a significant increase in green strength cannot be attained. Conversely, excessive amounts are uneconomical. It is preferable for producing better effects from this point of view that the aqueous solution of the carboxyl-group-containing polymer should contain 20 to 95% by weight of water (the corresponding concentration of the carboxyl-group-containing polymer in the aqueous solution being 5 to 80% by weight), preferably not more than 80% by weight of water (the corresponding concentration of the carboxyl-group-containing polymer in the aqueous solution being not less than 20% by weight).

Water may be added in place of the aqueous solution of the carboxyl-group-containing polymer, as the case may be. In such case, the proportion of water (e) to molding sand (c), i.e. the ratio e/c, is 0.005–0.05 by weight.

The sand molds can be manufactured by adding to and mixing with molding sand (c) carboxylic acid component (a) such as a polycarboxylic acid, a mixture thereof, a hydroxycarboxylic acid, a mixture thereof or a mixture of a polycarboxylic acid and a hydroxycarboxylic acid and water or an aqueous solution of carboxyl-group-containing polymer (d) and then adding to and mixing with the mixture divalent or trivalent metal oxide or hydroxide (b) followed by shaping in a conventional manner. The order of addition of carboxylic acid component (a), water (e) or the aqueous solution of carboxyl-group-containing polymer (d) and magnesium oxide to the molding sand is not critical and always almost the same results are obtained. Although sufficient green strength can be developed by standing at ambient temperatures for several hours, the molds may be heated during standing.

The sand molds manufactured by the method of the invention are excellent in filling efficiency and thereof it is not always necessary to apply pressure. However, in cases where extremely high strength is desired, an appropriate pressure may be applied in shaping the molds.

The invention will be illustrated more in detail by the following examples, which, however, should by no means be construed as limiting the invention. The divalent or trivalent metal oxide or hydroxide is abbreviated to "metal compound (b)" and the carboxyl-group-containing polymer to "polymer (d)".

I Examples of Dicarboxylic acid (a)-Metal compound (b)-Molding sand (c)-Aqueous solution of Polymer (d) Systems Example 1

Maleic anhydride powder (MA) and magnesium oxide (MgO) were added to and mixed with quartz sand in the proportions shown in Table 1, then an aqueous solution of polyacrylic acid (hereinafter abbreviated to PAA) having a concentration of 40% was added. After kneading the mixture, a test specimen was prepared therefrom by filling a mold with the mixture according to the method of preparing test specimens as specified in Japanese Industrial Standards (JIS) Z 2604. The mold for shaping the specimen was allowed to stand at ordinary temperatures under isolation from the atmosphere for 4 hours. Thereafter, green strength was measured. The amounts of quartz sand, aqueous solution of PAA, MA and MgO and the green strength after 4 hours of standing at ordinary temperatures are shown in Table 1.

TABLE 1

| Composition | | a | b* | c* | d | e* | f* | g* | h* | i |
|---|---|---|---|---|---|---|---|---|---|---|
| Quartz sand | (g) | 150 | 150 | 150 | 150 | 150 | 150 | 150 | 150 | |
| Aqueous solution of PAA | (g) | 0.5 | 0.5 | 0.5 | 0.1 | 0.25 | 2.0 | 6.0 | 19.0 | 25.0 |
| MA | (g) | 0 | 1.0 | 0.5 | 1.0 | 1.0 | 10.0 | 2.0 | 2.0 | 2.0 |
| MgO | (g) | 0.5 | 0.5 | 0.5 | 0.2 | 0.2 | 1.5 | 1.5 | 3.0 | 3.0 |
| Green strength (kg/cm$^2$) | | 0.1 | 1.81 | 1.68 | 0 | 0.86 | 3.16 | 3.31 | 5.35 | 0.24 |

*Compositions falling under the scope of the present invention.

As can be seen in Table 1, green strength is too low for practical purposes with composition (a) lacking maleic anhydride. Even when the composition contains all the constituents specified by the present invention, sufficient green strength cannot be obtained if the amounts of the constituents are not within the range specified by the present invention (cf. compositions d and i). On the other hand, foundry sand molds having green strength sufficient for practical use can be manufactured with compositions b, c, e, f, g and h which are provided by the present invention.

Example 2

An aqueous solution of polyacrylic acid (PAA) having a concentration of 40% and maleic anhydride powder (MA) were added to and mixed with quartz sand, then magnesium oxide powder (MgO) (Kyowamag 20, manufactured by Kyowa Gas Kagaku Kogyo K.K.) was added and the resulting mixture was kneaded and shaped into a test specimen by filling a mold with the mixture by the method of preparing test specimens as specified in JIS Z 2604. The specimen was allowed to stand at ordinary temperatures for 4 hours under isolation from the atmosphere. Green strength was then measured. The results are shown in Table 2.

TABLE 2

| Composition | 2-a | 2-b* | 2-c* | 2-d* | 2-e* | 2-f* | 2-g |
|---|---|---|---|---|---|---|---|
| Quartz sand (g) | 150 | 150 | 150 | 150 | 150 | 150 | 150 |
| Aqueous solution of PAA (g) | 2.0 | 7.5 | 2.0 | 5.5 | 7.5 | 7.5 | 7.5 |
| MA (g) | 2.0 | 2.0 | 2.0 | 2.0 | 2.0 | 2.0 | 2.0 |
| MgO (g) | 0.05 | 0.25 | 1.0 | 1.5 | 3.0 | 6.0 | 9.0 |
| Green strength (kg/cm$^2$) | 0 | 0.82 | 3.87 | 3.75 | 5.75 | 0.87 | 0 |

*Compositions covered by the present invention.

As can be seen in Table 2, sufficient green strength could not be obtained when the proportion of MgO to the molding sand was 0.0003 (=0.05/150) by weight. On the contrary, sufficient green strength could be obtained when the proportion was 0.00166 (=0.25/150) to 0.04 (=6.0/150).

Example 3

Maleic anhydride powder (MA) (2 g) and 1.5 g of a metal oxide or hydroxide specified in Table 3 were mixed with 150 g of quartz sand and then 7 g of an aqueous solution of polyacrylic acid (PAA) having a concentration of 40% was further added. The resulting mixture was kneaded and shaped into a test specimen by filling a mold therewith by the method of preparing test specimens as specified in JIS Z 2604. The test specimen was allowed to stand at ordinary temperatures for 4 hours under isolation from the atmosphere. Green strength was then measured. The results are shown in Table 3.

TABLE 3

| Kind of metal oxide or hydroxide | Calcium oxide CaO | Zinc oxide ZnO | Calcium hydroxide Ca(OH)$_2$ | Magnesium oxide MgO |
|---|---|---|---|---|
| Green strength (Kg/cm$^2$) | 3.75 | 3.27 | 1.25 | 6.81 |

Example 4

Two grams (2 g) of maleic anhydride power (MA) and 1.5 g of magnesium oxide (MgO, Kyowamag 20) were mixed with 150 g of quartz sand, and 3 g of an aqueous solution of polyacrylic acid (PAA) having a concentration of 40% was further added. The mixture was kneaded and a test specimen was prepared therefrom by filling a mold therewith according to JIS Z 2604. The specimen was allowed to stand for 4 hours under isolation from the atmosphere and then green strength was measured. Separately, a test specimen was prepared by the same procedure as above and placed on an iron plate heated at 1,000° C. and kept there for 5 minutes. The specimen was removed from the iron plate, crushed and, after stirring for homogenization, analyzed chemically. The losses of PAA, MA and water were 0.435 g, 0.725 g and 1.65 g, respectively. To the sand after crushing, there were added 0.725 g of MA, 1.09 g of the 40% PAA solution and 1.0 g of water. The resulting mixture was kneaded and shaped into a test specimen by filling a mold therewith by the above-mentioned method and green strength was measured in the same manner as mentioned above. This procedure was repeated four times more and each time green strength was measured. The results are shown in Table 4.

TABLE 4

| No. of repetition | 1 | 2 | 3 | 4 | 5 |
|---|---|---|---|---|---|
| Green strength (kg/cm$^2$) | 6.06 | 7.34 | 4.33 | 3.72 | 5.10 | 4.56 |

As can be seen in Table 7, no significant decrease in green strength was observed even after five times repeated use. It could be concluded from the results that the method of the present invention can be used in actual practice.

II. Examples of Polycarboxylic acid (a)-Metal compound (b)-Molding sand (c)-Aqueous solution of Polymer (d) Systems Example 5

Polycarboxylic acids (PCA) containing 3 or more carboxyl groups per molecule and an aqueous solution of polyacrylic acid (PAA) having a concentration of 30% were added to and mixed with quartz sand in the proportions specified in Table 5 and then magnesium oxide (MgO) was added. Test specimens were prepared by filling a mold with each of the resulting mixtures by the method of preparing test specimens as specified in JIS Z 2604, allowed to stand at ordinary temperatures for 4 hours and tested for green strength. The amounts of quartz sand, PCA, aqueous solution of PAA and MgO and the green strength after 4 hours of standing at ordinary temperatures are shown in Table 5.

TABLE 5

| Composition | | 5-a | 5-b | 5-c | 5-d | 5-e |
|---|---|---|---|---|---|---|
| Quartz sand | (g) | 150.0 | 150.0 | 150.0 | 150.0 | 150.0 |
| PCA | | | | | | |
| Kind | | Tricarballylic acid | 2-carboxy-maleic acid | Trimellitic acid | Trimellitic anhydride | Pyromellitic acid |
| Amount | (g) | 3.0 | 4.0 | 3.0 | 3.0 | 4.0 |
| Aqueous solution of PAA | (g) | 2.0 | 2.3 | 2.1 | 2.2 | 2.0 |
| MgO | (g) | 1.5 | 1.3 | 1.5 | 1.2 | 1.5 |
| Green strength (kg/cm$^2$) | | 3.54 | 2.95 | 5.72 | 5.91 | 4.17 |

As can be seen in Table 5, sufficiently high green strength can be developed by using the polycarboxylic acids having 3 or more carboxyl groups per molecule together with the aqueous solution of PAA and MgO in the proportions specified in Table 5 followed by 4 hours of standing at ordinary temperatures. On the contrary, when the amount of the aqueous solution of PAA was reduced to 0.1 g with the amounts of quartz sand, trimellitic acid and MgO being maintained respectively at the same levels as in composition c in Table 5, the green strength was too low to be measured (green strength 0.0 kg/cm$^2$). When the amount of MgO was reduced to 0.05 g with the amounts of quartz sand, trimellitic anhydride and aqueous solution of PAA being maintained respectively at the same levels as in composition d in Table 5, the green strength was too low to be measured.

Example 6

Trimellitic acid (hereinafter abbreviated to TMA) was mixed with maleic anhydride (MA) in the two proportions specified in Table 6. Each mixture, together with an aqueous solution of polyacrylic acid (PAA) having a concentration of 30%, was added to and mixed with quartz sand, and then magnesium oxide (MgO), magnesium hydroxide (Mg(OH)$_2$) or iron oxide (Fe$_2$O$_3$) was added to prepare the sand compositions shown in the table. Test specimens were prepared by filling a mold with each of the resulting mixtures or sand compositions by the method of preparing test specimens as specified in JIS Z 2604, allowed to stand at ordinary temperatures for 4 hours and tested for green strength. The ratios of TMA to MA, the amounts of TMA-MA mixture, water, aqueous solution of PAA, MgO, Mg(OH)$_2$ and Fe$_2$O$_3$ as well as the green strength values obtained after 4 hours of standing at ordinary temperatures are shown in Table 6.

TABLE 6

| Composition | | 6-a | 6-b | 6-c |
|---|---|---|---|---|
| Quartz sand | (g) | 150.0 | 150.0 | 150.0 |
| TAM/MA ratio | (g) | 90/10 | 80/20 | 80/20 |
| Amount of TMA-MA mixture | (g) | 3.0 | 3.0 | 3.0 |
| Aqueous solution of PAA | (g) | 2.1 | 2.1 | 2.1 |
| MgO | (g) | 1.5 | — | — |
| Mg(OH)$_2$ | (g) | — | 1.5 | — |
| Fe$_2$O$_3$ | (g) | — | — | 3.5 |
| Green strength (kg/cm$^2$) | | 5.28 | 1.27 | 0.95 |

As can be seen in Table 6, sufficiently high green strength can be obtained after 4 hours of standing at ordinary temperatures when such mixtures of trimellitic acid (TMA) and maleic anhydride (MA) are added to quartz sand in combination with an aqueous solution of PAA and with any one of MgO, Mg(OH)$_2$ and Fe$_2$O$_3$.

III. Examples of Hydrocarboxylic acid (a)-Metal compound (b)-Molding sand (c)-Aqueous solution of Polymer (d) Systems Example 7

Each of the hydroxycarboxylic acids (hereinafter abbreviated to OCA) shown in Table 7 and water or an aqueous solution of polyacrylic acid (PAA) having a concentration as specified in the table were added to and mixed with quartz sand and then magnesium oxide (MgO) was added. Each mixture, after mixing up, was shaped into a test specimen by filling a mold therewith by the method of preparing test specimens as specified in JIS Z 2604. The specimen was allowed to stand at ordinary temperature for 4 hours and tested for green strength. The results are shown in Table 7.

TABLE 7

| Composition | | 7-a | 7-b | 7-c | 7-d | 7-e |
|---|---|---|---|---|---|---|
| Quartz sand | (g) | 200 | 200 | 200 | 200 | 200 |
| OCA | kind | Lactic acid | Citric acid | Tartaric acid | 2-Hydroxy isophthalic acid | Malic acid |
| | (g) | 3.0 | 3.5 | 4 | 4 | 3.5 |
| Concentration of aqueous PAA solution | (%) | 40 | 20 | 30 | 40 | 20 |
| | (g) | 3.0 | 2.5 | 2.5 | 3.0 | 2.4 |
| MgO | (g) | 1.5 | 2.0 | 2.0 | 2.0 | 1.4 |
| Compression strength (kg/cm²) | after 4 hrs. | 1.1 | 11.7 | 2.8 | 3.5 | 6.5 |
| | after 24 hrs. | | 17.0 | | | 15.3 |

As can be seen in the table, adequate green strength could be developed after 4 hours of standing at ordinary temperatures by mixing any one of lactic acid, citric acid, tartaric acid, 2-hydroxyisophthalic acid, and malic acid together with an aqueous solution of PAA and MgO, with quartz sand followed by shaping. As in the cases of compositions 7-b, the use of citric acid can provide sand molds having especially high strength. When the amount of MgO was reduced to 0.05 g, which was smaller than the lower limit specified by the present invention, with the amount of the remaining components being maintained respectively at the same levels as in composition 7-b, the green strength was too low to be measured.

Example 8

Each of the mixtures of various hydroxycarboxylic acid (OCA) and various polycarboxylic acids (PCA) as shown in Table 8 and an aqueous solution of polyacrylic acid (PAA) having a concentration as specified in Table 8 were added to and mixed with quartz sand and then magnesium oxide (MgO), magnesium hydroxide (Mg(OH)₂) or iron oxide (Fe₂O₃) was added. After mixing up, each of the resulting mixtures was shaped into a test specimen by filling a mold therewith by the method of preparing test specimens as specified in JIS Z 2604. The test specimen was allowed to stand at ordinary temperatures for 4 hours and tested for green strength. The results are shown in Table 8.

TABLE 8

| Composition | | 8-a | 8-b | 8-c |
|---|---|---|---|---|
| Quartz sand | (g) | 200 | 200 | 200 |
| OCA | Kind | Citric acid | Citric acid | Citric acid |
| | (g) | 2.5 | 1.5 | 2.0 |
| PCA | Kind | Trimellitic anhydride | Trimellitic acid | Tricarballylic acid |
| | (g) | 1.0 | 2.0 | 1.5 |
| Concentration of aqueous solution of PAA | (%) | 20 | 40 | 30 |
| | (g) | 2.5 | 3.0 | 2.5 |
| MgO | (g) | — | — | 2.0 |
| Mg(OH)₂ | (g) | 1.0 | — | — |
| Fe₂O₃ | (g) | — | 5.0 | — |
| Compression strength (kg/cm²) | | 3.28 | 1.15 | 5.62 |

As can be seen in Table 8, adequate green strength can be obtained after 4 hours of standing at ordinary temperatures when hydroxycarboxylic acid such as citric acid is used in admixture with polycarboxylic acids such as trimellitic anhydride, trimellitic acid and tricarballylic acid.

IV. Examples of Carboxylic acid (a)-Specific magnesium oxide (b)-Molding sand (c)-Aqueous solution of Polymer (d) Systems The size (D) of a specific magnesium oxide in the [200] direction of the crystal thereof as measured by X-ray diffractometry is the value determined by the following procedure.

Apparatus: Geiger Flex D-3F, Rigaku Denki K.K.
Measuring conditions: 35 KV, 10 mA, Cu Kα ray made monochromatic through a nickel (Ni) filter; wavelength of the X-ray (λ)=1.5418 angstroms
Calculation of the size (D) in the [200] direction of the crystal: The following Scherrer's equation is used:

$$D = K\lambda / \sqrt{B^2 - b^2} \cos\theta$$

where
K is the Scherrer's constant,
B is the half-width of the peak given by the X-ray diffracted by the [200] plane (2θ=43°) of magnesium oxide, and
b is the equipment constant.

Example 9

Quartz sand (1600 g), 20 g of a 20% aqueous solution of polyacrylic acid and 32 g of citric acid were blended and then 12 g of each of magnesium oxide (MgO) species having various crystal sizes (D) in the [200] direction as shown in Table 9 was added, followed by mixing up. Test specimens were prepared by filling molds with the mixtures immediately after the mixing and after 5, 10 and 20 minutes of standing after the mixing by the method of preparing test specimens as specified in JIS Z 2604, then allowed to stand at ordinary temperatures for 24 hours and tested for green strength. The results are shown in Table 9. The magnesium oxide species having desired crystal sizes were prepared by roasting.

TABLE 9

| | | Crystal size of MgO (D) | Green compression strength (kg/cm²) after | | | |
|---|---|---|---|---|---|---|
| | | | 0 min. | 5 min. | 10 min. | 20 min. |
| Comparison | a | 200 Å | 6.75 | 5.50 | 1.50 | 0.25 |
| Example | b | 240 | 8.55 | 8.20 | 8.75 | 7.65 |
| Example | c | 270 | 11.21 | 12.74 | 15.29 | 14.52 |
| Example | d | 300 | 3.85 | 3.52 | 3.55 | 3.45 |
| Comparison | e | 360 | 0.15 | 0.10 | — | — |

As can be seen in Table 9, the sand compositions of Comparative Example a made with the magnesium oxide species having crystal sizes (D) of 200 and 360 angstroms, when formed into test specimens after standing for 10 minutes or more following the mixing, gave significantly decreased strength as compared with that of the test specimens made immediately after the mixing, whereas, in Examples b, c and d where the magnesium oxide species having crystal sizes (D) of 240, 270 and 300 angstroms, respectively, were used, the strength of each test specimen made 20 minutes after the mixing was not so different from that of the corresponding specimen prepared immediately after the mixing. In Comparative Example e where the magnesium oxide used had a crystal size (D) of 360 angstroms, even the test specimen prepared directly after the mixing had not any adequate strength. In Comparative Example a, filling of the mold could be done only with difficulty except for the composition immediately after the mixing.

For producing conditions as close as possible to those in actual casting practice, the test specimens made in Example c were placed on an iron plate heated at 1,000° C. with the bases of the specimens brought into contact with the iron plate, kept there for 5 minutes and allowed to cool. When the specimens were cool, they were sprayed with water. For some time directly after the spraying, they retained firmly their stable shapes but became more and more disintegratable with the lapse of time. One hour after the spraying with water, they could easily be disintegrated by mere touching with the hand. The resulting sand composition was dried and sieved for preparation for reuse. The aqueous polyacrylic acid solution and citric acid were added to this sand and sand molds were prepared by the above-mentioned method and tested for green strength. The strength values were almost the same as those shown in Table for Example c. A number of times repetition of such reuse caused little changes in green strength.

V. Examples of Carboxylic acid (a)-Specific magnesium oxide (b)-Molding sand (c)-Water (e) Systems Examples 10, 11 & 12 and Comparative Examples 1, 2 & 3

As shown in Table 10, maleic anhydride (MA), trimellitic acid (TMA) or citric acid (CA) and water added to 200 g of quartz sand, and then two kinds of magnesium oxide (MgO) having different crystal size (D) were each added, followed by mixing up. Test specimens were prepared by filling molds with mixture 0 (zero) and 20 or 25 minutes after the mixing by method of preparing test specimens as specified in JIS Z 2604, allowed to stand at ordinary temperatures for 24 hours and tested for green strength. The results are shown in Table 10.

TABLE 10

| Example No. | 10 | | 11 | | 12 | |
|---|---|---|---|---|---|---|
| Comparative No. | 1 | 2 | | 3 | | |
| Amount of quartz sand (g) | 200 | 200 | 200 | 200 | 200 | 200 |
| Carboxylic acid | MA | MA | TMA | TMA | CA | CA |
| Amount (g) | 4.0 | 4.0 | 3.0 | 3.0 | 5.0 | 5.0 |
| Size (D) of MgO (A) | 200 | 270 | 200 | 270 | 200 | 270 |
| Amount (g) | 2.0 | 2.0 | 1.5 | 1.5 | 2.0 | 2.0 |
| Amount of water (g) | 2.0 | 2.0 | 1.5 | 1.5 | 2.0 | 2.0 |
| Green compression strength $F_0$ (kg/cm$^2$) $F_{25}$ | 0.25 | 5.75 | 4.81 | 5.10 | 5.04 | 10.5 |
| | 0.25 | 5.20 | | 0.1 | 4.55 | 0.20 | 9.7 |
| $F_{20}$ or $F_{25}$ $F_0$ | 0.05 | 0.91 | 0.02 | 0.89 | 0.04 | 0.92 |

$F_0$, $F_{20}$, and $F_{25}$ are the green compression strength for the specimen shaped at 0, 20, and 25 minutes after mixing.

As can be seen in Table 10, in Examples 10, 11 and 12 where the magnesium oxide had a crystal size (D) of 270 angstroms, the test specimens made 20 or 25 minutes after the mixing revealed little difference in green strength as compared with those prepared directly after the mixing, whereas, in Comparative Examples 1, 2 and 3 where the magnesium oxide had a crystal size (D) of 200 angstroms, the test specimens made 20 or 25 minutes after the mixing showed remarkable decrease in green strength as compared with those prepared immediately after the mixing.

Having now fully described the invention, it will be apparent to one of ordinary skill in the art that many changes and modifications can be made thereto without departing from the spirit or scope of the invention as set forth herein.

What is claimed is:

1. A method of manufacturing foundry sand molds which comprises mixing (a) 0.0015-0.2 parts by weight of a polycarboxylic acid having 2-20 carbon atoms and containing two or more carboxyl groups per molecule or a hydroxyl carboxylic acid having 2-20 carbon atoms and containing at least one carboxyl group and one hydroxyl group; (b) 0.001-0.05 parts by weight of an oxide or hydroxide of magnesium, aluminum, calcium, zinc or iron and (c) one part by weight of a foundry molding sand in the presence of water and (d) 0.006-0.055 parts by weight of a carboxyl group containing polymer selected from the group consisting of homopolymers and copolymers of unsaturated aliphatic carboxylic acids, polyvinyl alcohols containing side chains into which carboxyl groups have been introduced, and carboxymethylcellulose followed by shaping and curing.

2. The method of claim 1, wherein the carboxylic acid (a) is a saturated aliphatic dicarboxylic acid selected from the group consisting of oxalic, malonic, succinic, glutaric, adipic, pimelic, suberic, azelaic and sebacic acid.

3. The method of claim 1, wherein the carboxylic acid (a) is tricarballylic acid.

4. The method of claim 1, wherein the carboxylic acid (a) is an unsaturated aliphatic dicarboxylic acid selected from the group consisting of maleic acid, maleic anhydride, fumaric acid, citraconic acid, mesaconic acid, itaconic acid and itaconic anhydride.

5. The method of claim 1, wherein the carboxylic acid (a) is an unsaturated aliphatic tri- or polycarboxylic acid selected from the group consisting of 2-carboxymaleic acid and 2-carboxyglutaconic acid.

6. The method of claim 1, wherein the carboxylic acid (a) is an aromatic dicarboxylic acid selected from the group consisting of phthalic acid, isophthalic acid, terephthalic acid and phthalic anhydride.

7. The method of claim 1, wherein the carboxylic acid (a) is an aromatic tri- or polycarboxylic acid selected from the group consisting of trimellitic acid, trimellitic anhydride, pyromellitic acid, 1,2,4,5-benzenetetracarboxylic dianhydride and benzenepentacarboxylic acid.

8. The method of claim 1, wherein the carboxylic acid (a) is an aliphatic hydroxycarboxylic acid selected from the group consisting of glycolic, malic, lactic, trihydroxyglutaric, tartaric, citric and hydroxyacrylic acid.

9. The method of claim 1, wherein the carboxylic acid (a) is an aromatic hydroxycarboxylic acid selected from the group consisting of hydroxybenzoic, 2-hydroxyisophthalic, 4,5-dihydroxyphthalic and 2,5-dihydroxyterephthalic acid.

10. The method of claim 1, wherein the carboxylic acid (a) is maleic anhydride.

11. The method of claim 1, wherein the carboxylic acid (a) is citric acid or malic acid.

12. The method of claim 1, wherein the divalent or trivalent metal oxide or hydroxide (b) is a metal compound selected from the group consisting of magnesium oxide, calcium oxide, zinc oxide, aluminum oxide, magnesium hydroxide, calcium hydroxide, aluminum hydroxide and iron oxide.

13. The method of claim 1, wherein the divalent or trivalent metal oxide or hydroxide is magnesium oxide.

14. The method of claim 1, wherein the divalent or trivalent metal oxide or hydroxide is magnesium oxide that has a size of 220 to 320 angstroms in the [200] direction of the crystal thereof as measured by X-ray diffractometry.

15. The method of claim 1, wherein the carboxyl-group-containing polymer (d) is a polymer selected from the group consisting of polyacrylic acid, acrylic acid copolymers, methacrylic acid copolymers, alpha-olefin-maleic anhydride copolymers, styrenemaleic anhydride copolymer, vinyl acetate-maleic anhydride copolymer and methy vinyl ether-maleic anhydride copolymer.

16. The method of claim 1, wherein the carboxyl-group-containing polymer is a homopolymer or copolymer of an unsaturated aliphatic carboxylic acid.

17. The method of claim 16, wherein the unsaturated aliphatic carboxylic acid is an acid selected from the group consisting of acrylic, methacrylic, crotonic, itaconic, maleic, citraconic and mesaconic acid.

18. A method of manufacturing foundry sand molds, which comprises:

(a) mixing maleic anhydride, magnesium oxide and a foundry molding sand in amounts such that the weight ratio of maleic anhydride to sand ranges from 0.00015 to 0.2 and the weight ratio of magnesium oxide to sand ranges from 0.001 to 0.05 in the presence of an aqueous solution of polyacrylic acid, wherein the proportion by weight of said polyacrylic acid to sand ranges from 0.0006 to 0.055 and the proportion by weight of water in said solution to sand ranges from 0.005 to 0.05;

(b) shaping the mixture; and (c) curing the shaped mixture.

19. A method of manufacturing foundry sand molds, which comprises:

(a) mixing citric acid, magnesium oxide and a foundry molding sand in amounts such that the weight ratio of citric acid to sand ranges from 0.00015 to 0.2 and the weight ratio of magnesium oxide to sand ranges from 0.001 to 0.05 in the presence of an aqueous solution of polyacrylic acid, wherein the proportion by weight of said polyacrylic acid to sand ranges from 0.0006 to 0.055 and the proportion by weight of water in said solution to sand ranges from 0.005 to 0.05;

(b) shaping the mixture; and (c) curing the shaped mixture.

* * * * *